(12) United States Patent
Mori et al.

(10) Patent No.: US 11,029,916 B2
(45) Date of Patent: Jun. 8, 2021

(54) ELECTRONIC DEVICE AND CONTROL METHOD AND STORAGE MEDIUM

(71) Applicant: CANON KABUSHIKI KAISHA, Tokyo (JP)

(72) Inventors: Tomokazu Mori, Fujisawa (JP); Yoshihiro Kobayashi, Kawasaki (JP); Akitaka Yoshizawa, Yokohama (JP); Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/787,995

(22) Filed: Feb. 11, 2020

(65) Prior Publication Data

US 2020/0264834 A1    Aug. 20, 2020

(30) Foreign Application Priority Data

Feb. 18, 2019   (JP) ............................. JP2019-026718

(51) Int. Cl.
| | |
|---|---|
| *G06F 3/16* | (2006.01) |
| *H04R 1/10* | (2006.01) |
| *H04R 1/02* | (2006.01) |
| *H04R 3/00* | (2006.01) |
| *H04N 5/232* | (2006.01) |

(52) U.S. Cl.
CPC ......... *G06F 3/165* (2013.01); *H04N 5/23227* (2018.08); *H04R 1/028* (2013.01); *H04R 1/1041* (2013.01); *H04R 3/00* (2013.01); *H04R 2499/11* (2013.01); *H04R 2499/15* (2013.01)

(58) Field of Classification Search
CPC .............. H04R 1/1041; H04R 2420/07; H04R 1/1016; H04R 5/033; H04R 1/1008
USPC ................................... 381/370, 182, 333, 74
See application file for complete search history.

(56) References Cited

U.S. PATENT DOCUMENTS

| | | | | |
|---|---|---|---|---|
| 2004/0246342 | A1* | 12/2004 | Kim ................... | H04N 5/23222 348/207.99 |
| 2011/0007916 | A1* | 1/2011 | Chapero-Rueda ... | H04R 25/552 381/315 |
| 2017/0099432 | A1* | 4/2017 | DeLuca ............. | H04N 5/23219 |

FOREIGN PATENT DOCUMENTS

JP        2007-124361 A     5/2007

\* cited by examiner

*Primary Examiner* — Alexander Krzystan
(74) *Attorney, Agent, or Firm* — Canon U.S.A., Inc. IP Division

(57) ABSTRACT

An electronic device includes an internal speaker, a connection unit configured to connect an external speaker, an operation unit configured to receive a user operation, and a control unit, wherein, in a case where the external speaker is connected via the connection unit in a state in which the internal speaker is controlled not to output an electronic sound, the control unit controls the operation unit to receive an instruction to change a setting for switching whether to output an electronic sound, and wherein, in a case where the external speaker is not connected via the connection unit in a state in which the internal speaker is controlled not to output an electronic sound, the control unit controls the operation unit not to receive an instruction to change a setting for switching whether to output an electronic sound.

11 Claims, 5 Drawing Sheets

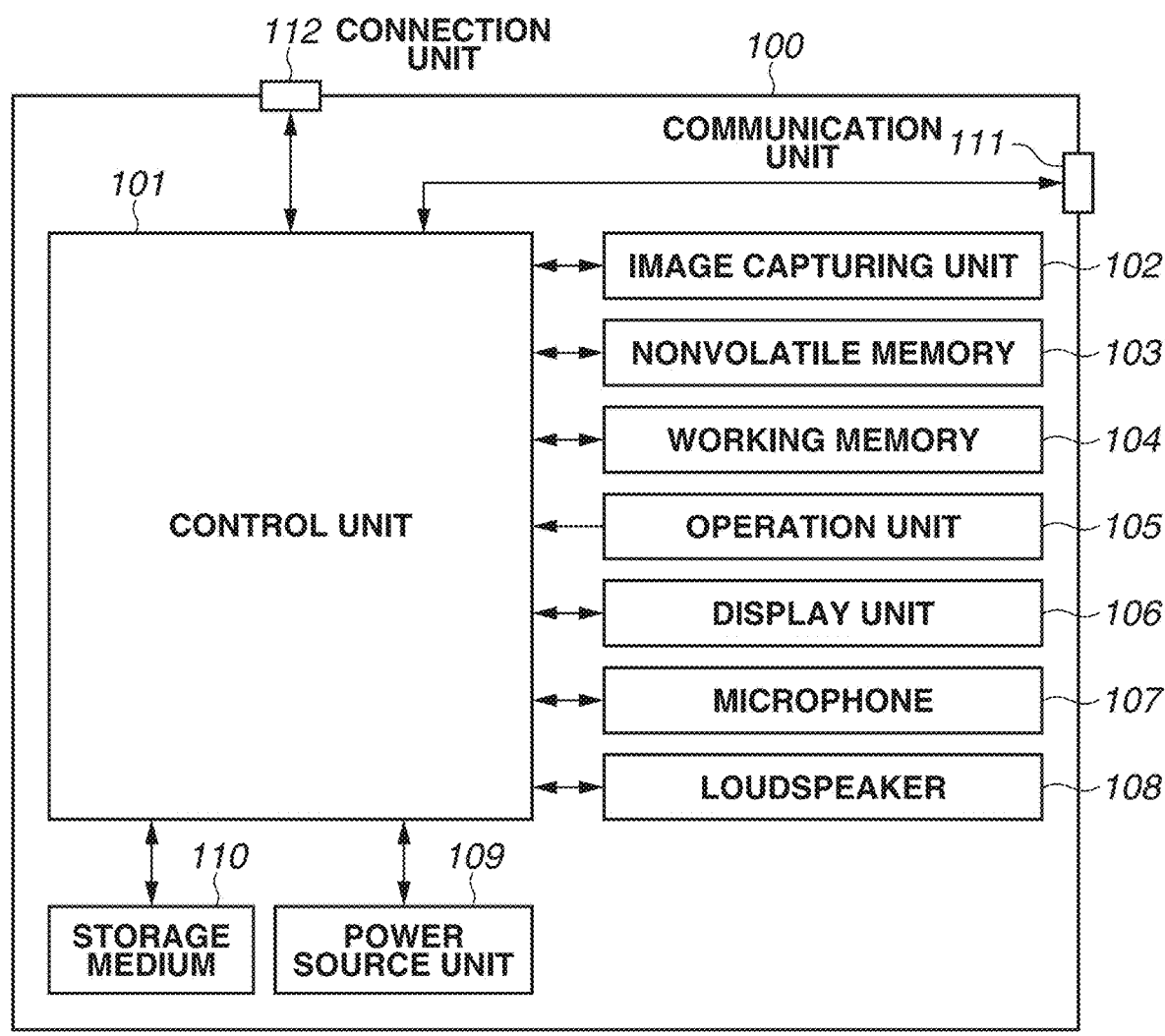
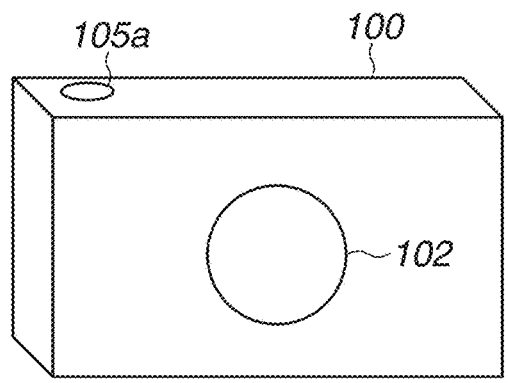
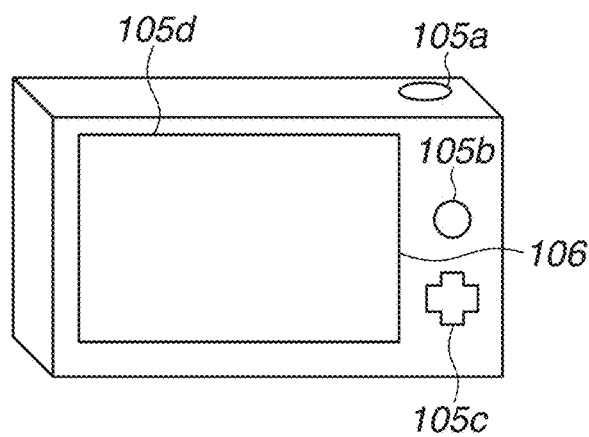

FIG.2A

| SETTING | |
|---|---|
| 200 ~ SHUTTER MODE | ELECTRONIC |
| 210 ~ ELECTRONIC SOUND | ON |
| 220 ~ SILENT MODE | OFF |

FIG.2B

| SETTING | |
|---|---|
| SHUTTER MODE | MECHANICAL ~201 |
| | ELECTRONIC ~202 |

FIG.2C

| SETTING | |
|---|---|
| | ON ~211 |
| ELECTRONIC SOUND | SHUTTER ONLY ~212 |
| | OFF ~213 |

FIG.2D

| SETTING | |
|---|---|
| | ON ~221 |
| SILENT MODE | OFF ~222 |

FIG.3A

| | | |
|---|---|---|
| | SETTING | |
| 200 | SHUTTER MODE | ELECTRONIC |
| 210 | ELECTRONIC SOUND | OFF |
| 220 | SILENT MODE | ON |

FIG.3B

| | | |
|---|---|---|
| | SETTING | |
| 200 | SHUTTER MODE | ELECTRONIC |
| 210 | ELECTRONIC SOUND | OFF |
| 220 | SILENT MODE | ON |

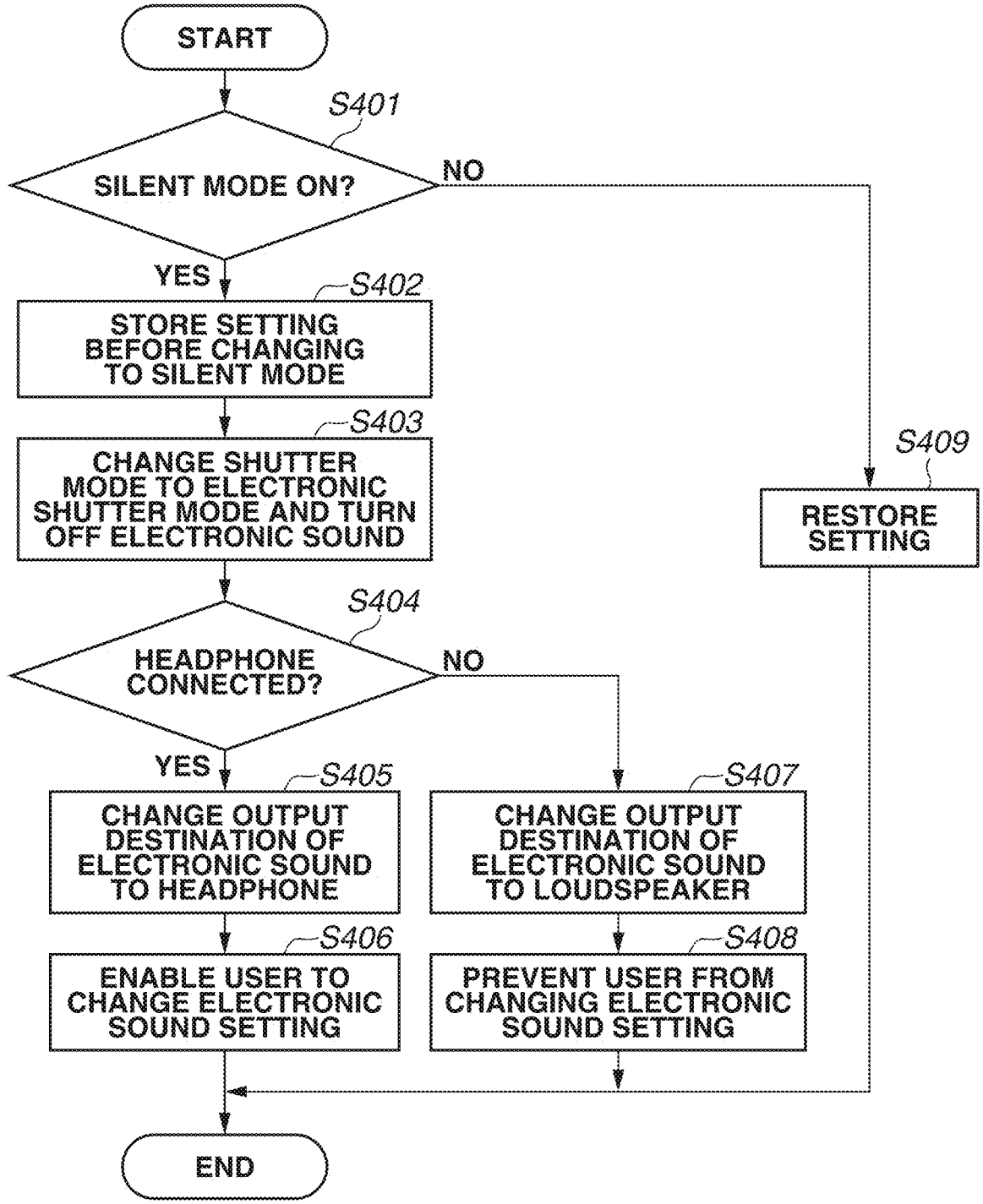

ELECTRONIC DEVICE AND CONTROL METHOD AND STORAGE MEDIUM

BACKGROUND

Field of the Disclosure

The present disclosure relates to an electronic device capable of outputting a sound.

Description of the Related Art

Electronic devices such as digital cameras and smartphones incorporate loudspeakers and can output electronic sounds such as operation sounds and alarm sounds from the loudspeakers. However, for example, in a case where a user uses a smartphone in a museum or a concert and an electronic sound is output from a loudspeaker, the sound may cause a trouble to surrounding people. Therefore, some digital cameras and smartphones can be used without outputting electronic sounds from loudspeakers.

According to Japanese Patent Application Laid-Open No. 2007-124361, a digital camera is described which does not output a sound from a loudspeaker in a case where a volume of ambient sound exceeds a threshold value.

However, for example, when a user takes a picture, the user sometimes wants to hear an electronic shutter sound to know a timing when the picture is taken even when the digital camera is in a state not outputting an electronic sound from the loudspeaker. For example, in a case where a user uses a loudspeaker, such as a headphone which does not leak a sound to the surroundings, the user can hear an electronic sound without causing a trouble to surrounding people in a place such as a museum and a concert. As described above, there is a situation in which a user wants to hear an electronic sound from an electronic device even when the electronic device is operated not to output the electronic sound from a loudspeaker.

SUMMARY

An electronic device includes an internal speaker, a connection unit configured to connect an external speaker, an operation unit configured to receive a user operation, and a control unit, wherein, in a case where the external speaker is connected via the connection unit in a state in which the internal speaker is controlled not to output an electronic sound, the control unit controls the operation unit to receive an instruction to change a setting for switching whether to output an electronic sound, and wherein, in a case where the external speaker is not connected via the connection unit in a state in which the internal speaker is controlled not to output an electronic sound, the control unit controls the operation unit not to receive an instruction to change a setting for switching whether to output an electronic sound.

Further features of the present disclosure will become apparent from the following description of exemplary embodiments with reference to the attached drawings.

BRIEF DESCRIPTION OF THE DRAWINGS

FIG. 1A is an example of a block diagram illustrating a digital camera according to a first exemplary embodiment.
FIGS. 1B and 1C are examples of external views of the digital camera according to the first exemplary embodiment.
FIG. 2A illustrates an example of screen display for setting an image capturing mode, an output of an electronic sound, and a silent mode of the digital camera according to the first exemplary embodiment. FIG. 2B illustrates an example of screen display for setting the image capturing mode of the digital camera according to the first exemplary embodiment. FIG. 2C illustrates an example of screen display for setting an output of an electronic sound according to the first exemplary embodiment. FIG. 2D illustrates an example of screen display for setting the silent mode of the digital camera according to the first exemplary embodiment.

FIG. 3A illustrates an example of a setting screen of the digital camera to which a headphone is not connected in the silent mode according to the first exemplary embodiment. FIG. 3B illustrates an example of the setting screen of the digital camera to which the headphone is connected in the silent mode according to the first exemplary embodiment.

FIG. 4 is a flowchart illustrating an example of processing for switching the silent mode of the digital camera according to the first exemplary embodiment.

DESCRIPTION OF THE EMBODIMENTS

Figure 5:
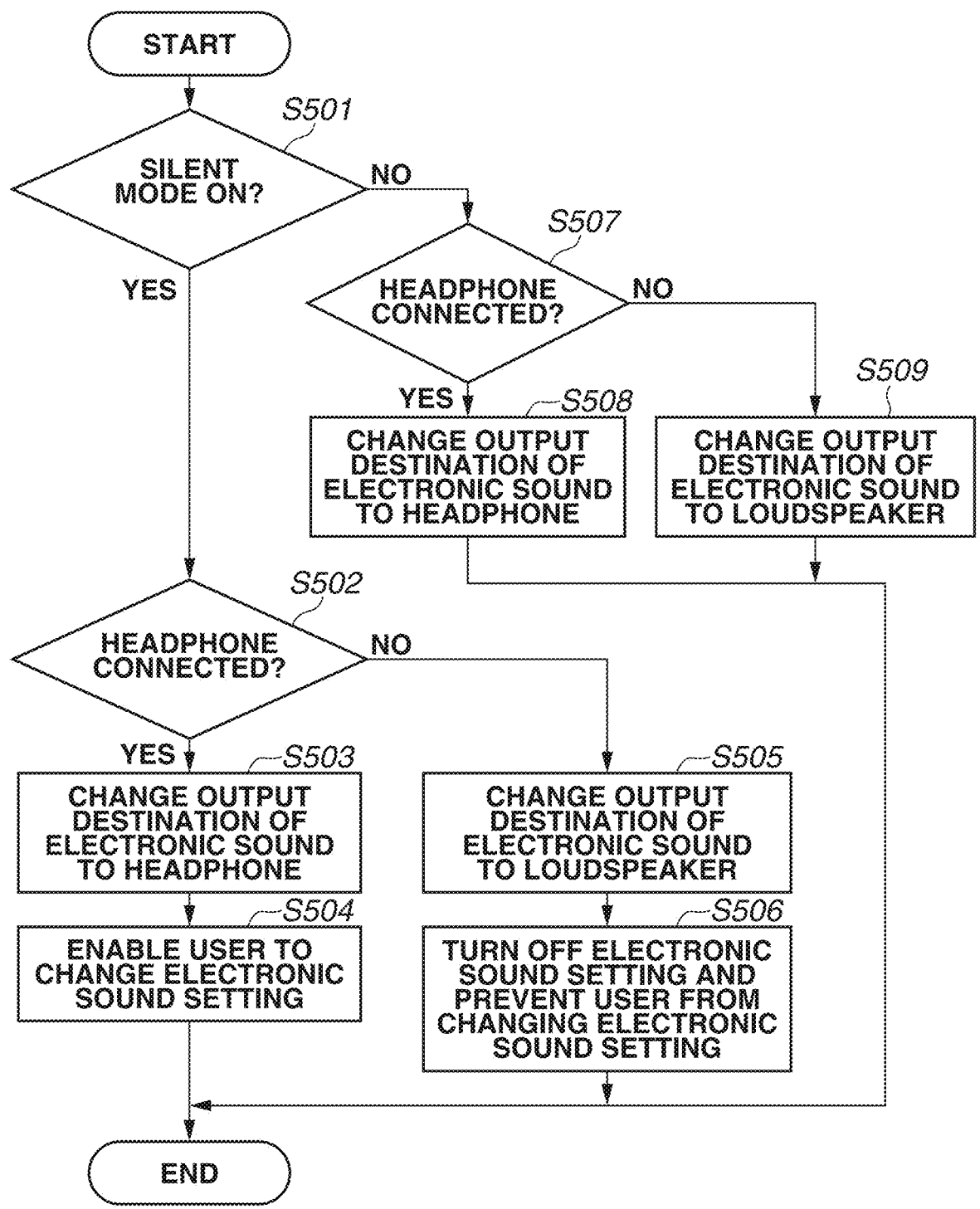
FIG. 5 is a flowchart illustrating an example of processing for switching a setting of an electronic sound based on connection or disconnection of an external speaker by the digital camera according to the first exemplary embodiment.

Various exemplary embodiments of the present disclosure will be described in detail below with reference to the attached drawings.

[Configuration of Digital Camera]

FIG. 1A is a block diagram illustrating a configuration example of a digital camera 100 as an example of an electronic device according to a first exemplary embodiment. The digital camera is described as an example of an electronic device. However, the electronic device is not limited to the digital camera. For example, the electronic device may be a device which can connect to an internal speaker built into a smartphone, a tablet terminal, and the like and an external speaker A control unit 101 controls each unit in the digital camera 100 according to an input signal and a program described below. The control unit 101 can convert audio data stored in the nonvolatile memory 103 and a storage medium 110, which are described below, into an audio signal and output the audio signal via a loudspeaker 108, a communication unit 111, and a connection unit 112. A plurality of pieces of hardware may control the entire device by sharing processing instead of the control unit 101 controlling the entire device.

An image capturing unit 102 includes, for example, an optical system which controls an optical lens unit, an aperture, zooming, and focusing and an image pickup element which converts light (image) introduced via the optical lens unit into an electrical image signal. Generally, a complementary metal oxide semiconductor (CMOS) and a charge coupled device (CCD) are used as the image pickup element. The image capturing unit 102 is controlled by the control unit 101 and converts object light focused by a lens included in the image capturing unit 102 into an electrical signal by the image pickup element, performs noise reduction processing on the electrical signal, and outputs digital data as image data. The image capturing unit 102 further includes a light shielding shutter which can freely control an exposure time of the image pickup element by control of the control unit 101. The light shielding shutter is, for example, a focal plane shutter and a lens shutter. According to the present exemplary embodiment, a series of processes for capturing image data and outputting the image data is referred to as "image capturing". The digital camera 100 according to the present exemplary embodiment stores the image data in the storage medium 110 described below according to standards of Design rule for Camera File system (DCF).

The nonvolatile memory 103 is an electrically erasable and recordable nonvolatile memory and stores a below-described program to be executed by the control unit 101 and the like. The nonvolatile memory 103 stores audio data. For example, the audio data is data of an electronic sound such as a focus sound which is output when an object is focused, an electronic shutter sound which is output when an image is captured, and an operation sound which is output when the digital camera 100 is operated. According to the present exemplary embodiment, the electronic shutter sound is an imitative sound which imitates a sound of opening and closing the light shielding shutter in the image capturing unit 102. However, the electronic shutter sound may be largely different from an actual opening/closing sound of the light shielding shutter in a tone and a length as long as a user can recognize that an image is captured. The audio data is recorded in a pulse code modulation (PCM) format and a format of the Moving Picture Experts Group-1 Audio Layer III or MPEG-2 Audio Layer III (MP3).

A working memory 104 is used as a buffer memory temporarily storing image data captured by the image capturing unit 102, an image display memory of a display unit 106, and a work area of the control unit 101.

An operation unit 105 is a user interface for receiving an instruction to the digital camera 100 from a user. The operation unit 105 can include, for example, a power source button for a user to instruct ON/OFF of a power source of the digital camera 100, a release switch for instructing image capturing, and a reproduction button for instructing reproduction of the image data. Further, a touch panel formed on the display unit 106 can be included in the operation unit 105. The release switch includes a switch 1 (SW1) and a switch 2 (SW2). When the release switch is brought into a half-pressed state, the SW1 is turned ON. Accordingly, the operation unit 105 receives a preparation instruction to perform a preparation operation for image capturing such as automatic focus (AF) processing, automatic exposure (AE) processing, automatic white balance (AWB) processing, and preliminary flash light emission (EF) processing. Further, when the release switch is brought into a full-pressed state, the SW2 is turned ON. According to the above-described user operation, the operation unit 105 receives an image capturing instruction to perform an image capturing operation. The operation unit 105 further includes a mode change-over switch and switches an operation mode of the control unit 101 to any one of a still image capturing mode, a moving image capturing mode, and a reproduction mode. The still image capturing mode includes an automatic image capturing mode, an automatic scene discrimination mode, a manual mode, an aperture priority mode (an Av mode), a shutter speed priority mode (Tv mode), and a program AE mode. The still image capturing mode further includes various scene modes and custom modes for an image capturing setting for each scene. A user can directly switch a mode to any of the above-described modes using the mode change-over switch. Alternatively, a user may temporarily switch to a list screen of the image capturing mode by the mode change-over switch, then select one from a plurality of displayed modes, and switch the mode using another operation member. The operation unit 105 further includes a button for adjusting a volume of a sound to be output from the loudspeaker 108, the communication unit 111, and the connection unit 112. A user operation is received via the button, and thus the control unit 101 executes processing for adjusting an amplitude of an audio signal and processing for determining whether to output the audio signal.

The display unit 106 displays a viewfinder image at the time of image capturing, captured image data, and a character for an interactive operation. The display unit 106 does not necessarily have to be built into the digital camera 100 and may be externally connected to the digital camera 100. The digital camera 100 can at least connect to an internal or external display unit 106 and include at least a display control function of controlling display on the display unit 106.

The storage medium 110 may be detachable to the digital camera 100 or built into the digital camera 100. The digital camera 100 may include a unit for accessing at least the storage medium 110.

A microphone 107 is used to input a sound wave of a sound, a voice, and the like to the digital camera 100. The microphone 107 converts the sound and the voice into electrical signals and inputs the electrical signals to the digital camera 100. The control unit 101 generates audio data from the input electrical signal. The control unit 101 stores the audio data synchronously with moving image data captured by the image capturing unit 102. According to the present exemplary embodiment, audio data to be transmitted for live distribution is stored in the working memory 104. The microphone 107 may be detachable to the digital camera 100 or built into the digital camera 100. In other words, the digital camera 100 may include a unit for receiving an electrical signal at least from the microphone 107.

The loudspeaker 108 is an electroacoustic converter which can output an electronic sound such as a piece of music and an alarm sound. According to the present exemplary embodiment, the control unit 101 can convert audio data stored in the nonvolatile memory 103 into an audio signal and output the audio signal as an alarm sound and the like from the loudspeaker 108. The loudspeaker 108 is an example of an internal speaker. For example, when a user hears a sound output from the loudspeaker 108, the user can recognize an alarm by the digital camera 100 and the like.

A power source unit 109 is controlled by the control unit 101 and supplies power to each element in the digital camera 100. The power source unit 109 is a power source such as a lithium-ion battery and an alkaline manganese dry cell battery.

The communication unit 111 is an interface for wirelessly connecting to an external device. The digital camera 100 according to the present exemplary embodiment can exchange data with the external device via the communication unit 111. For example, the digital camera 100 can transmit image data generated by the image capturing unit 102 and audio data stored in the nonvolatile memory 103 to the external device via the communication unit 111. The external device is an information device such as a smartphone and a personal computer (PC). According to the present exemplary embodiment, the communication unit 111 includes an interface for communicating with the external device in accordance with standards of Bluetooth® (registered trademark). The control unit 101 realizes wireless communication with the external device by controlling the communication unit 111. A communication method is not limited to Bluetooth® and includes, for example, a wireless local area network (LAN) in accordance with standards of Institute of Electrical and Electronics Engineers (IEEE) 802.11 and a wireless communication method such as infrared communication. Further, the control unit 101 can wirelessly connect to a wearable external speaker such as an earphone and a headphone via the communication unit 111.

The connection unit 112 is an interface for connecting to an external device by wire. The digital camera 100 according to the present exemplary embodiment can exchange data with the external device via the connection unit 112. For example, the digital camera 100 can transmit image data generated by the image capturing unit 102 and audio data stored in the nonvolatile memory 103 to the external device via the connection unit 112. The connection unit 112 is, for example, a phone connector (namely a headphone terminal) and a Universal Serial Bus (USB) terminal. The digital camera 100 can perform wired connection with an external speaker such as an earphone and a headphone and the information device such as a smartphone and a PC via the connection unit 112. The connection unit 112 further includes a detection unit (not illustrated) which detects whether the external device is connected thereto. The control unit 101 can detect that the external device is connected and disconnected, the external device is being connected, the external device is not connected, and the like via the detection unit.

Next, an external appearance of the digital camera 100 will be described. FIGS. 1B and 1C illustrate examples of the external appearance of the digital camera 100. A release switch 105a, a reproducing button 105b, a direction key 105c, and a touch panel 105d are operation members included in the above-described operation unit 105. The display unit 106 displays an image obtained by a result of image capturing by the image capturing unit 102.

The digital camera 100 has been described above.

[Description of Image Capturing Mode]

An image capturing mode of the digital camera 100 will be described. The digital camera 100 includes two image capturing modes namely an electronic shutter mode and a mechanical shutter mode.

In the mechanical shutter mode, the control unit 101 controls the light shielding shutter included in the image capturing unit 102 to open and close, thus exposes the image pickup element, and captures an image. Image capturing in the mechanical shutter mode has advantages such that rolling shutter distortion tends not to occur, and a captured image includes less noise.

In the electronic shutter mode, the control unit 101 performs image capturing without opening and closing the light shielding shutter. In image capturing in the electronic shutter mode, the light shielding shutter is in an open state. The control unit 101 controls an exposure time of the image pickup element included in the image capturing unit 102 by referring to a time measurement unit (not illustrated). Image capturing in the electronic shutter mode has advantages such that a shutter speed can be set faster than that in the mechanical shutter mode, and vibration is difficult to occur in image capturing.

In image capturing in the electronic shutter mode, the light shielding shutter does not open and close, and thus a shutter sound is not generated. Therefore, the control unit 101 outputs the electronic shutter sound stored in the nonvolatile memory 103 via the loudspeaker 108, the communication unit 111, and the connection unit 11.

A user can operate the digital camera 100 in a silent mode. In the silent mode, the digital camera 100 does not output an electronic sound from the loudspeaker 108. The electronic sound is, for example, a focus sound, the electronic shutter sound, and an operation sound. The silent mode is a mode suitable for a case where image capturing is performed in a place which requires a user to be quiet such as a sports competition venue and an art museum. A user can turn on and off the silent mode by operating the digital camera 100 via the operation unit 105. Further, according to the present exemplary embodiment, the digital camera 100 is operated in the electronic shutter mode in a case of the silent mode. This is because, in the case of the mechanical shutter mode, the light shielding shutter generates an opening/closing sound when capturing an image, and image capturing cannot be performed without generating a sound. On the other hand, in the electronic shutter mode, the light shielding shutter is kept opened, so that image capturing can be performed without generating a sound. In addition, the digital camera 100 does not execute light emission processing such as flash preliminary light emission and AF assist light in the silent mode. This is because flash imaging (stroboscopic photographing) is sometimes required to be prohibited with respect to, for example, an athlete during competition and a painting in the art museum.

However, the digital camera 100 can output the electronic sound to the headphone and the like via the communication unit 111 and the connection unit 112 in the silent mode. This is because, if the digital camera 100 outputs the electronic sound to the headphone and the like, it can be thought that the electronic sound is only transmitted to a user who uses the digital camera 100, and it is unlikely that surrounding people hear the electronic sound output from the headphone.

[Setting Method of Image Capturing Mode]

Next, an example of a method for setting the image capturing mode is described. FIGS. 2A to 2D illustrate examples of a menu screen for setting the image capturing mode and the silent mode. FIGS. 3A and 3B illustrate examples of the menu screen in a case where the operation mode is shifted to the silent mode. The control unit 101 displays, for example, the menu screen on the display unit 106 in response to receiving an operation for shifting to the menu screen from a user via the operation unit 105. The user can change each setting by operating the operation unit 105. According to the present exemplary embodiment, the control unit 101 displays the menu screen as illustrated in FIG. 2A. An item 200 is used for setting the image capturing mode. An item 210 is used for setting whether the digital camera 100 outputs the electronic sound to the headphone. An item 220 is used for setting whether the digital camera 100 operates in the silent mode. According to the present exemplary embodiment, in a case where an item is selected, the control unit 101 performs control not to display other items on the display unit 106. Accordingly, the user can easily select an option of the selected item.

In FIG. 2A, in a case where the user selects the item 200 via the operation unit 105, the control unit 101 displays a menu for selecting either one of the mechanical shutter mode and the electronic shutter mode as illustrated in FIG. 2B. In a case where the user selects an option 201, a setting of the digital camera 100 is changed to the one for performing image capturing in the mechanical shutter mode. In this case, the control unit 101 performs control not to output the electronic shutter sound to the loudspeaker 108 regardless of a setting of the electronic sound. This is because, for example, if a user hears both of the opening/closing sound of the light shielding shutter in the image capturing unit 102 and the electronic shutter sound when capturing an image, the user may be confused at which timing of the sound the image was captured. In a case where the user selects an option 202, the setting of the digital camera 100 is changed to the one for performing image capturing in the electronic shutter mode. In this case, the control unit 101 performs control to output the electronic sound to the loudspeaker 108 if the operation mode is not the silent mode.

In FIG. 2A, in a case where the user selects the item 210 via the operation unit 105, the control unit 101 displays a menu for selecting whether to output the electronic sound as illustrated in FIG. 2C. In a case where the user selects an option 211 ("ON"), the control unit 101 performs control to output the electronic sound from the loudspeaker 108 if the operation mode is not the silent mode. In a case where the user selects an option 212 ("SHUTTER ONLY"), the control unit 101 performs control to output the electronic shutter sound from the loudspeaker 108 and not to output other electronic sounds if the operation mode is not the silent mode. In a case where the user selects an option 213 ("OFF"), the control unit 101 performs control not to output the electronic sound from the loudspeaker 108 and an external speaker.

In FIG. 2A, in a case where the user selects the item 220 via the operation unit 105, the control unit 101 displays a menu for selecting whether to operate in the silent mode (ON or OFF) as illustrated in FIG. 2D. In a case where the user selects an option 221 ("ON"), the digital camera 100 operates in the silent mode. In a case where the user selects an option 222 ("OFF"), the digital camera 100 releases the silent mode. In a case where the user selects the option 221 ("ON"), the control unit 101 operates in the electronic shutter mode and performs control not to output the electronic sound from the loudspeaker 108. For example, in a case where the silent mode is ON, the control unit 101 displays the item 200 and the item 210 with hatching as illustrated in FIG. 3A so that settings regarding the shutter mode and the electronic sound cannot be changed.

In a case where the external speaker such as the headphone is connected, the control unit 101 can switch the setting regarding the electronic sound even when the setting of the digital camera 100 is changed to operate in the silent mode. According to the present exemplary embodiment, in a case where the setting of the digital camera 100 is changed to operate in the silent mode, the control unit 101 automatically changes the setting for not outputting the electronic sound even in a state in which the headphone is connected thereto. In this case, the control unit 101 displays the item 210 without hatching, for example, as illustrated in FIG. 3B which is different from the screen illustrated in FIG. 3A. If the setting is changed by a user operation to output the electronic sound in this state, the control unit 101 performs control to output the electronic sound to the headphone. However, even in this state, the control unit 101 does not output the electronic sound from the loudspeaker 108. Therefore, processing by the control unit 101 is automatically switched depending on presence or absence of connection of the headphone even when the same item is set.

As described above, in a case where a user operation to operate in the silent mode is received, the control unit 101 automatically controls the digital camera 100 to operate in the electronic shutter mode and performs control not to output the electronic sound. Further, in a case where the headphone is connected to the digital camera 100, the control unit 101 can change the setting to output the electronic sound to the headphone by a user operation. Accordingly, the user can hear the electronic sound while operating the digital camera 100 in the silent mode. Particularly, the digital camera 100 can reproduce the electronic shutter sound from the headphone in the silent mode in which the sound is not output to the surroundings, the user can recognize a timing when the digital camera 100 captures an image.

According to the present exemplary embodiment, the control unit 101 displays an item with hatching to indicate that a user operation thereto is not to be received in FIGS. 3A and 3B. However, a display method other than hatching display may be used. For example, the control 101 does not display an item which does not receive a user operation. Further, for example, in a case where the item which does not receive a user operation is selected by the user operation, the control unit 101 displays a warning like "this item cannot be changed in the silent mode". Further, for example, in a case where the item which does not receive a user operation is selected by the user operation, the control unit 101 does not return a response to the user and thus informs the user that the selected item is cannot be changed.

[Processing for Switching Silent Mode]

Processing for the control unit 101 to switch the mode will be described with reference FIG. 4. According to the present exemplary embodiment, an external speaker to be connected to the digital camera 100 is described below as a headphone. The processing by the digital camera 100 is realized by the control unit 101 developing software stored in the nonvolatile memory 103 on the working memory 104 and executing the software. Further, the processing is started being triggered by reception of a user operation for switching ON or OFF of the silent mode.

In step S401, the control unit 101 determines whether the silent mode is ON. For example, the control unit 101 determines whether the item 220 is set to the option 221 or the option 222 in the screen illustrated in FIG. 3A. In a case where the silent mode is ON (in a case where the item 220 is set to the option 221) (YES in step S401), the control unit 101 advances the processing to step S402. In a case where the silent mode is not ON (in a case where the item 220 is set to the option 222) (NO in step S401), the control unit 101 advances the processing to step S409. First, a case will be described in which the silent mode is ON.

In step S402, the control unit 101 stores a setting that was set before the setting was changed to the silent mode in the nonvolatile memory 103. For example, the control unit 101 stores a setting regarding the shutter mode and the electronic sound. The setting stored in step S402 is used in the processing in step S407.

In step S403, the control unit 101 controls the digital camera 100 to operate in the electronic shutter mode of the shutter mode and performs control not to output the electronic sound.

In step S404, the control unit 101 determines whether the headphone is connected to the digital camera 100. For example, the control unit 101 determines whether the headphone is connected to the communication unit 111 or the connection unit 112. In a case where the headphone is connected (YES in step S404), the control unit 101 advances the processing to step S405. In a case where the headphone is not connected (NO in step S404), the control unit 101 advances the processing to step S407. First, a case will be described in which the headphone is connected to the digital camera 100.

In step S405, the control unit 101 changes an output destination of the electronic sound to the connected headphone. In this case, the control unit 101 controls the digital camera 100 not to output the electronic sound to the loudspeaker 108. However, the control unit 101 controls the digital camera 100 not to output the electronic sound from the headphone at that time. Accordingly, for example, it can reduce a possibility that a sound is loudly reproduced from the headphone at the moment when the user connects the headphone to the digital camera 100.

In step S406, the control unit 101 enables the user to change the setting of the electronic sound (whether to output the electronic sound). For example, the control unit 101 displays the item 210 in a selectable state in a setting menu as illustrated in FIG. 3B. In a case where the item 210 is set to the option 211 or the option 212 by a user operation, the control unit 101 performs control to output the electronic sound to the headphone. The control unit 101 does not output the electronic sound to the loudspeaker 108 regardless of the setting of the item 210. Next, a case will be described in which the headphone is connected to the digital camera 100.

In step S407, the control unit 101 changes the output destination of the electronic sound to the loudspeaker 108. In this case, the control unit 101 stops the control to output the electronic sound to the headphone.

In step S408, the control unit 101 prevent the user from changing the setting of the electronic sound (whether to output the electronic sound). For example, the control unit 101 displays the item 210 with hatching in the setting menu as illustrated in FIG. 3A. Thus, the control unit 101 displays the screen to the user to indicate that the setting of the electronic sound cannot be changed. The case in which the silent mode is ON has been described above. Next, a case will be described in which the silent mode is OFF.

In step S409, the control unit 101 restores the setting that was set before the digital camera 100 came to operate in the silent mode. For example, the control unit 101 reads the setting stored in step S402 and restores the setting. Further, in a case where the setting of the shutter mode or the setting of the electronic sound is prohibited from being changed, the control unit 101 enables the user to change the setting in step S409.

The processing for switching the silent mode by the digital camera 100 has been described above. Accordingly, a user can hear the electronic sound by externally connecting the headphone even when the digital camera 100 operates in the silent mode.

According to the present exemplary embodiment, the control unit 101 performs control not to output the electronic sound regardless of whether the headphone is connected. However, if the headphone is connected, the control unit 101 may not change the setting regarding the electronic sound. Accordingly, if the headphone is connected to the digital camera 100, a user can automatically hear the electronic sound from the headphone without separately performing an operation when switching to the silent mode.

In step S402, the control unit 101 stores the mode that was set before the setting was changed to the silent mode and, in step S409, restores the stored setting. However, the processing in these steps may be omitted. Accordingly, for example, in a case where a user changes a setting such as the output destination of the electronic sound in the silent mode, the user can use the digital camera 100 by taking over settings except that of the silent mode if the silent mode is released.

[Processing for Switching Setting of Electronic Sound Based on Connection or Disconnection of External Speaker]

Processing for switching the setting of the electronic sound based on connection or disconnection of an external speaker will be described with reference FIG. 5. According to the present exemplary embodiment, the external speaker to be connected to the digital camera 100 is described below as the headphone. The processing by the digital camera 100 is realized by the control unit 101 developing software stored in the nonvolatile memory 103 on the working memory 104 and executing the software. Further, the processing is started being triggered by connection or disconnection of the headphone to or from the digital camera 100.

In step S501, the control unit 101 determines whether the silent mode is ON. For example, the control unit 101 determines whether the item 220 is set to the option 221 or the option 222 in the screen illustrated in FIG. 3A. In a case where the silent mode is ON (in a case where the item 220 is set to the option 221) (YES in step S501), the control unit 101 advances the processing to step S502. In a case where the silent mode is not ON (in a case where the item 220 is set to the option 222) (NO in step S501), the control unit 101 advances the processing to step S507. First, a case will be described in which the silent mode is ON.

In step S502, the control unit 101 determines whether the headphone is connected to the digital camera 100. In a case where the headphone is connected (YES in step S502), the control unit 101 advances the processing to step S503. In a case where the headphone is not connected (NO in step S502), the control unit 101 advances the processing to step S505.

In step S503, the control unit 101 changes the output destination of the electronic sound to the connected headphone. In this case, the control unit 101 controls the digital camera 100 not to output the electronic sound to the loudspeaker 108. However, the control unit 101 controls the digital camera 100 not to output the electronic sound from the headphone at that time. In a case where a plurality of headphones is connected to the digital camera 100, the control unit 101 performs control to output the electronic sound to all of the headphones.

In step S504, the control 101 enables a user to change the setting of the electronic sound (whether to output the electronic sound). For example, the control unit 101 displays the item 210 in a selectable state in the setting menu as illustrated in FIG. 3B. The control unit 101 does not automatically change the setting regarding the electronic sound. In a case where the item 210 is set to the option 211 or the option 212 by a user operation, the control unit 101 performs control to output the electronic sound to the headphone. The control unit 101 does not output the electronic sound to the loudspeaker 108 regardless of the setting of the item 210.

In step S505, the control unit 101 changes the output destination of the electronic sound to the loudspeaker 108. In this case, the control unit 101 stops the control to output the electronic sound to the headphone.

In step S506, the control unit 101 prevents the user from changing the setting of the electronic sound (whether to output the electronic sound). For example, the control unit 101 displays the item 210 with hatching in the setting menu as illustrated in FIG. 3A. Thus, the control unit 101 displays the screen to the user to indicate that the setting of the electronic sound cannot be changed. The case in which the silent mode is ON has been described above. Next, a case will be described in which the silent mode is OFF.

In step S507, the control unit 101 determines whether the headphone is connected to the digital camera 100. In a case where the headphone is connected (YES in step S507), the control unit 101 advances the processing to step S508. In a case where the headphone is not connected (NO in step S507), the control unit 101 advances the processing to step S509.

In step S508, the control unit 101 changes the output destination of the electronic sound to the connected headphone. In this case, the control unit 101 controls the digital camera 100 not to output the electronic sound to the loudspeaker 108. In a case where a plurality of headphones is connected to the digital camera 100, the control unit 101 performs control to output the electronic sound to all of the headphones.

In step S509, the control unit 101 changes the output destination of the electronic sound to the loudspeaker 108. In this case, the control unit 101 stops the control to output the electronic sound to the headphone.

The processing for switching the setting of the electronic sound based on connection or disconnection of the external speaker has been described above. A user can hear the electronic sound from the headphone also in a case where the headphone is connected to the digital camera 100 after the digital camera 100 is set to operate in the silent mode.

In a case where the output destination of the electronic sound is changed, the digital camera 100 may notify a user of the change. For example, in step S503, the control unit 101 displays a message "electronic sound is switched to headphone output" on the display unit 106. Further, for example, in step S505, the control unit 101 displays a message "electronic sound is switched to loudspeaker output" on the display unit 106. A user can recognize that the digital camera 100 has automatically switched the output destination of the electronic sound.

Further, the control unit 101 may change display on the display unit 106 according to a change in a connection state of the headphone. For example, in a case where connection or disconnection of the headphone is detected, the control unit 101 displays the setting menu regarding sound output as illustrated in FIG. 2A and enables a user to immediately perform the setting regarding the electronic sound.

The present disclosure is not limited to the above-described exemplary embodiments and can be realized by modifications of components without departing from the scope and spirit of the present disclosure. Further, the present disclosure contemplates appropriately combining a plurality of components according to the above-described exemplary embodiments. For example, some components may be deleted from all of the components according to the above-described exemplary embodiments. Furthermore, the components in the different exemplary embodiments may be appropriately combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-026718, filed Feb. 18, 2019, which is hereby incorporated by reference herein in its entirety.

What is claimed is:

1. An electronic device comprising:
an internal speaker;
a connection unit configured to connect an external speaker;
an operation unit configured to receive a user operation;
a control unit; and
a display unit,
wherein the control unit controls the display unit so as to display an item that makes a setting of shutter sound selectable between on and off and an item that makes a setting of silent mode selectable between on and off,
wherein, in a case where the silent mode is set to be on via the operation unit, the internal speaker is controlled not to output an electronic shutter sound from the internal speaker, and, in addition, the control unit performs control so as to disable the user to operate the item that makes the setting of shutter sound selectable between on and off,
wherein, in a case where the silent mode is set to be off via the operation unit, the internal speaker is controlled to be able to output an electronic shutter sound from the internal speaker, and, in addition, the control unit performs control so as to enable the user to operate the item that makes the setting of shutter sound selectable between on and off, and
wherein, even in a case where the silent mode is set to be on via the operation unit, if the external speaker is connected via the connection unit, the control unit performs control so as to enable the user to operate the item that makes the setting of shutter sound selectable between on and off.

2. The electronic device according to claim 1, wherein, even in a case where the silent mode is set to be on via the operation unit, if the external speaker is connected via the connection unit, the control unit controls the connection unit to output an electronic shutter sound from the external speaker and controls the internal speaker not to output an electronic shutter sound.

3. The electronic device according to claim 1,
wherein, in a case where the external speaker is connected via the connection unit, the control unit controls the connection unit to output an electronic shutter sound from the connected external speaker, and
wherein, in a case where the external speaker is disconnected via the connection unit, the control unit controls the internal speaker to output an electronic shutter sound.

4. The electronic device according to claim 1, wherein, in a case where an electronic shutter sound is set not to be output by a user operation via the operation unit, the control unit controls the internal speaker and the external speaker not to output an electronic shutter sound.

5. The electronic device according to claim 1, further comprising an image capturing unit,
   wherein the control unit controls the image capturing unit not to generate a shutter sound in image capturing in a state in which the internal speaker is controlled not to output an electronic shutter sound, and
   wherein, in a case where the external speaker is connected via the connection unit in a state in which the image capturing unit is controlled not to generate a sound in image capturing, the connection unit is controlled to output an electronic shutter sound from the external speaker in response to image capturing by the image capturing unit.

6. The electronic device according to claim 5, wherein the control unit controls the image capturing unit to perform image capturing without using a mechanical shutter in a case where the silent mode is set to be on.

7. The electronic device according to claim 5, wherein the control unit does not execute light emission processing in image capturing by the image capturing unit in a case where the silent mode is set to be on.

8. The electronic device according to claim 1, wherein the external speaker is a headphone or an earphone.

9. A method for controlling an electronic device including an internal speaker, a connection unit configured to connect an external speaker, an operation unit configured to receive a user operation, and a display unit, the method comprising:
   controlling the display unit so as to display an item that makes a setting of shutter sound selectable between on and off and an item that makes a setting of silent mode selectable between on and off;
   in a case where the silent mode is set to be on via the operation unit, controlling the internal speaker not to output an electronic shutter sound from the internal speaker, and, in addition, performing control so as to disable the user to operate the item that makes the setting of shutter sound selectable between on and off;
   in a case where the silent mode is set to be off via the operation unit, controlling the internal speaker to be able to output an electronic shutter sound from the internal speaker, and, in addition, performing control so as to enable the user to operate the item that makes the setting of shutter sound selectable between on and off; and
   even in a case where the silent mode is set to be on via the operation unit, if the external speaker is connected via the connection unit, performing control so as to enable the user to operate the item that makes the setting of shutter sound selectable between on and off.

10. A non-transitory storage medium storing a program for causing an electronic device including an internal speaker, a connection unit configured to connect an external speaker, and an operation unit configured to receive a user operation, and a display unit to execute a method, the method comprising:
    controlling the display unit so as to display an item that makes a setting of shutter sound selectable between on and off and an item that makes a setting of silent mode selectable between on and off;
    in a case where the silent mode is set to be on via the operation unit, controlling the internal speaker not to output an electronic shutter sound from the internal speaker, and, in addition, performing control so as to disable the user to operate the item that makes the setting of shutter sound selectable between on and off;
    in a case where the silent mode is set to be off via the operation unit, controlling the internal speaker to be able to output an electronic shutter sound from the internal speaker, and, in addition, performing control so as to enable the user to operate the item that makes the setting of shutter sound selectable between on and off; and
    even in a case where the silent mode is set to be on via the operation unit, if the external speaker is connected via the connection unit, performing control so as to enable the user to operate the item that makes the setting of shutter sound selectable between on and off.

11. The electronic device according to claim 1, wherein, in a case where an instruction to set the silent mode off is received after receiving an instruction to set the silent mode on, the control unit performs control to (1) set the electronic shutter sound on if the setting of the electronic shutter sound that was set when the instruction to set the silent mode on was received is on and (2) set the electronic shutter sound off if the setting of the electronic shutter sound that was set when the instruction to set the silent mode on was received is off.

* * * * *